(12) United States Patent
Lee et al.

(10) Patent No.: US 6,191,565 B1
(45) Date of Patent: Feb. 20, 2001

(54) POWER FACTOR COMPENSATION CONTROLLER

(75) Inventors: Sang-Woo Lee; Kyung-Hee Jang, both of Bucheon (KR)

(73) Assignee: Fairchild Korea Semiconductor Ltd., Kyungki-do (KR)

( * ) Notice: Under 35 U.S.C. 154(b), the term of this patent shall be extended for 0 days.

(21) Appl. No.: 09/565,088

(22) Filed: May 5, 2000

(30) Foreign Application Priority Data

Jun. 14, 1999 (KR) ................................................ 99-22049

(51) Int. Cl.⁷ ...................................................... G05F 1/70
(52) U.S. Cl. .............................. 323/222; 323/207; 363/89
(58) Field of Search .................................. 323/205, 207, 323/222; 363/89

(56) References Cited

U.S. PATENT DOCUMENTS

| | | | | |
|---|---|---|---|---|
| 4,761,725 | * | 8/1988 | Henze ................................... | 323/222 |
| 5,006,975 | * | 4/1991 | Neufeld ................................. | 363/89 |
| 5,359,274 | * | 10/1994 | Bandel .................................. | 323/207 |
| 5,359,278 | * | 10/1994 | Notohasa et al. ..................... | 323/222 |
| 5,519,306 | * | 5/1996 | Itoh et al. ............................. | 323/207 |
| 5,644,214 | * | 7/1997 | Lee ...................................... | 323/222 |
| 5,691,889 | * | 11/1997 | Bazinet et al. ........................ | 363/89 |
| 5,742,151 | * | 4/1998 | Hwang ................................. | 323/207 |
| 5,867,379 | * | 2/1999 | Maksimovic et al. ................. | 363/89 |
| 6,069,470 | * | 5/2000 | Feldtkeller ............................ | 323/222 |

* cited by examiner

*Primary Examiner*—Jeffrey Sterrett
(74) *Attorney, Agent, or Firm*—Marshall, O'Toole, Gerstein, Murray & Borun

(57) ABSTRACT

A power factor compensation controller for use in a switching power supply having a switch, an inductor, and upper and lower reference signals that are proportional to an input voltage to the switching power supply includes a multiplier that multiplies an error signal and a signal representative of a current in the switch to produce a multiplier output signal. The power factor compensation controller further includes an adder that adds the multiplier output signal to the lower reference signal to produce an adder output signal and a comparator that compares the adder output signal to the upper reference signal to produce a comparator output signal. The power factor compensation controller also includes a flip-flop that receives the comparator output signal and a clocking signal and a logic gate that receives an output of the flip-flop and the clocking signal to produce a gating signal for controlling the conduction of the switch so that an envelope of peak currents in the switch is substantially in-phase with the input voltage to the switching power supply.

16 Claims, 5 Drawing Sheets

POWER FACTOR COMPENSATION
CONTROLLER

BACKGROUND OF THE INVENTION

1. Field of the Invention

The invention relates generally to switching power supplies and, more particularly, the invention relates to a power factor compensation controller for use in switching power supplies.

2. Description of Related Technology

Generally speaking, a switching power supply (SPS) provides a cost effective and energy efficient device for converting energy from a single direct current (DC) supply voltage into one or more DC output voltages that have a greater or lesser magnitude than the supply voltage. Traditionally, a SPS has an integrated control circuit that modulates the duty cycle of a transistor switch, which controls the flow of energy into the primary of a transformer or an input of an inductor to produce one or more desired output voltages that are derived from the secondary of the transformer or the output of the inductor, respectively. As is well known, the energy (i.e., the time integral of power) supplied to the primary of the transformer or the inductor minus efficiency losses equals the energy transferred to the secondary of the transformer or the output of the inductor. Thus, if more energy is needed at an output of the SPS, then the control circuit increases the duty cycle of the transistor switch to provide more energy to the primary of the transformer or the input of the inductor. Conversely, if less energy is needed at the output of the SPS, then the control circuit decreases the duty cycle of the transistor switch.

As is also well known, the inductive components within a SPS may be operated using one of a variety of conventional current conduction modes depending on the particular application for the SPS. For example, a boundary conduction mode (BCM) and a discontinuous conduction mode (DCM) each result in large peak currents and, as a result, BCM and DCM are typically used where small value inductors are desirable and where the SPS has a relatively small load (i.e., low power output). On the other hand, a continuous conduction mode (CCM) control technique requires a relatively large inductance value, which reduces the peak-to-average current ratio within the SPS and which allows a SPS to operate at relatively high power levels (e.g., 300 watts).

The power factor of a SPS can have a significant impact on the efficiency with which energy is conveyed from a source of input power (e.g., a source of alternating current line voltage) to a load that is connected to an output of the SPS. As a result, a variety of conventional techniques for controlling the power factor of a SPS operating in one of the aforementioned current control modes have been developed. For example, control over the power factor of a boost convertor operating in a CCM may be accomplished using an average current mode control (ACMC) method, a charge control method, a peak current mode control (PCMC) method, or a hysteresis control method. While the conventional ACMC, PCMC, hysteresis control, and charge control methods may be used to compensate the power factor of a SPS, these conventional methods typically require relatively complex circuitry and, in some cases, these conventional methods provide a limited compensation range that fails to compensate the power factor of the SPS over the entire range of SPS output loads.

SUMMARY OF THE INVENTION

In accordance with one aspect of the invention, a power factor compensation controller for use in a switching power supply having a switch, an inductor, and upper and lower reference signals that are proportional to an input voltage to the switching power supply includes a multiplier that multiplies an error signal and a signal representative of a current in the switch to produce a multiplier output signal. The power factor compensation controller may further include an adder that adds the multiplier output signal to the lower reference signal to produce an adder output signal and a comparator that compares the adder output signal to the upper reference signal to produce a comparator output signal. The power factor compensation controller may also include a flip-flop that receives the comparator output signal and a clocking signal and a logic gate that receives an output of the flip-flop and the clocking signal to produce a gating signal for controlling the conduction of the switch so that an envelope of peak currents in the switch is substantially in-phase with the input voltage.

In accordance with another aspect of the invention, a power factor compensation controller for use in a switching power supply having a switch, an inductor, and upper and lower reference signals that are proportional to an input voltage to the switching power supply includes a multiplication unit that multiplies an error signal and a signal representative of a current in the switch to produce a multiplier output signal. The power factor compensation controller may further include an error amplification unit that monitors an output of the switching power supply to produce an error signal and a switching driver that receives the multiplier output signal and the upper and lower reference signals and produces a fixed frequency gating signal for controlling the conduction of the switch so that an envelope of peak currents in the switch is substantially in-phase with the input voltage.

The invention itself, together with further objectives and attendant advantages, will best be understood by reference to the following detailed description, taken in conjunction with the accompanying drawings and the appended claims.

DETAILED DESCRIPTION OF THE PREFERRED EMBODIMENTS

The power factor compensation controller described herein uses active circuitry that enables a boost mode regulator or SPS to operate more efficiently. Generally speaking, the power factor compensation controller described herein includes active circuitry that controls the peak charging current that flows through the boost inductor of the SPS based on the instantaneous value of the supply voltage and the load on the SPS. More specifically, a switch within the SPS is controlled (i.e., turned on and off) so that the peak charging current flowing through the switch and the boost inductor is proportional to the instantaneous input voltage to the SPS. As a result, the current flowing through the boost inductor, which has an average value that is proportional to the peak current flowing through the switch, is maintained substantially in-phase with the input voltage to the SPS, thereby maintaining a power factor substantially near to one. Additionally, the switch of the SPS is controlled so that the peak current flowing through the switch is proportional to an output error voltage, which is indicative of the load on the SPS. As a result, the average current flowing through the boost inductor is scaled by the output error voltage to compensate for the load applied to the SPS.

Figure 1:
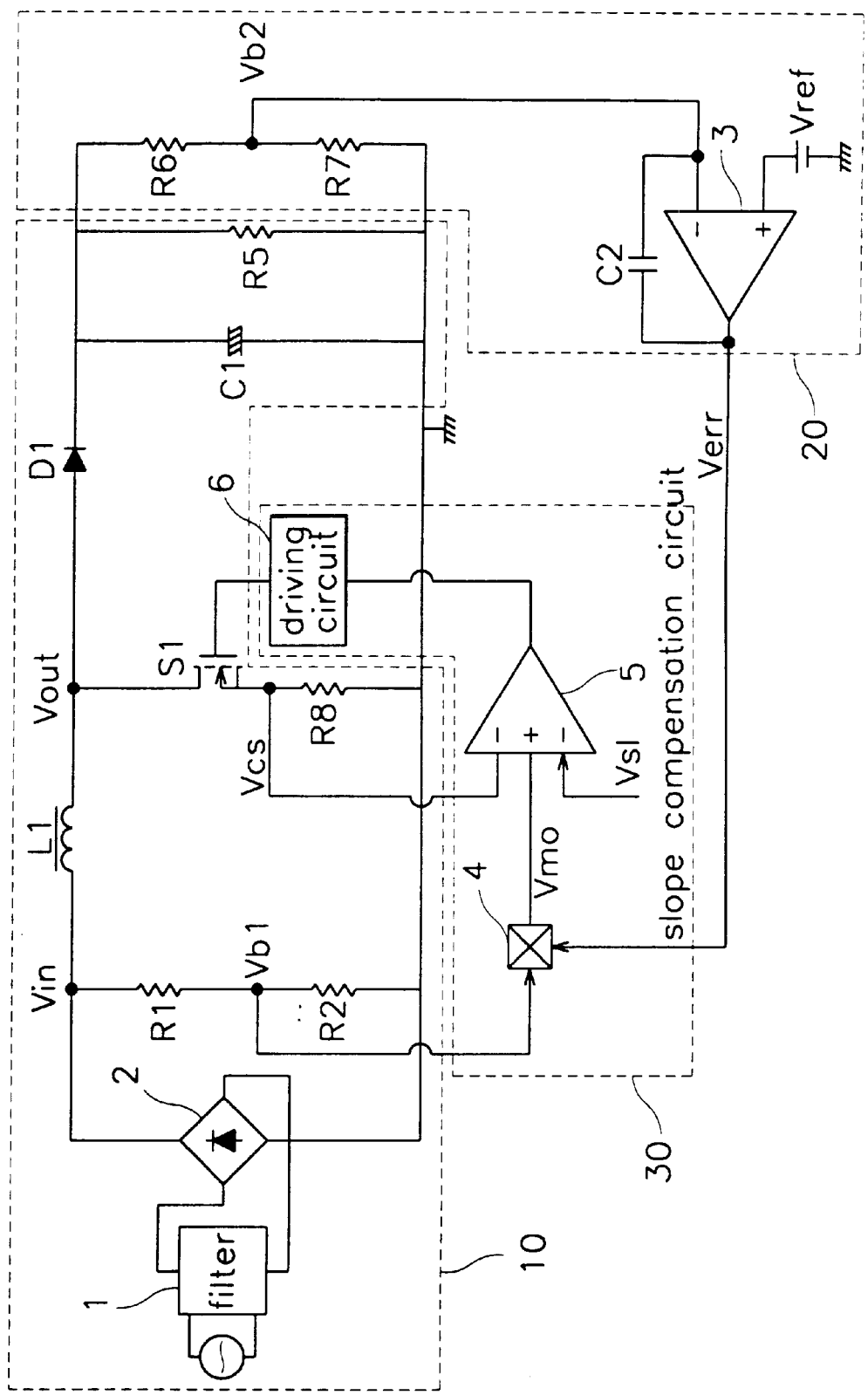
FIG. 1 is an exemplary schematic block diagram of a conventional boost regulator having a slope compensation circuit for compensating the power factor of the boost regulator.
Figure 2:
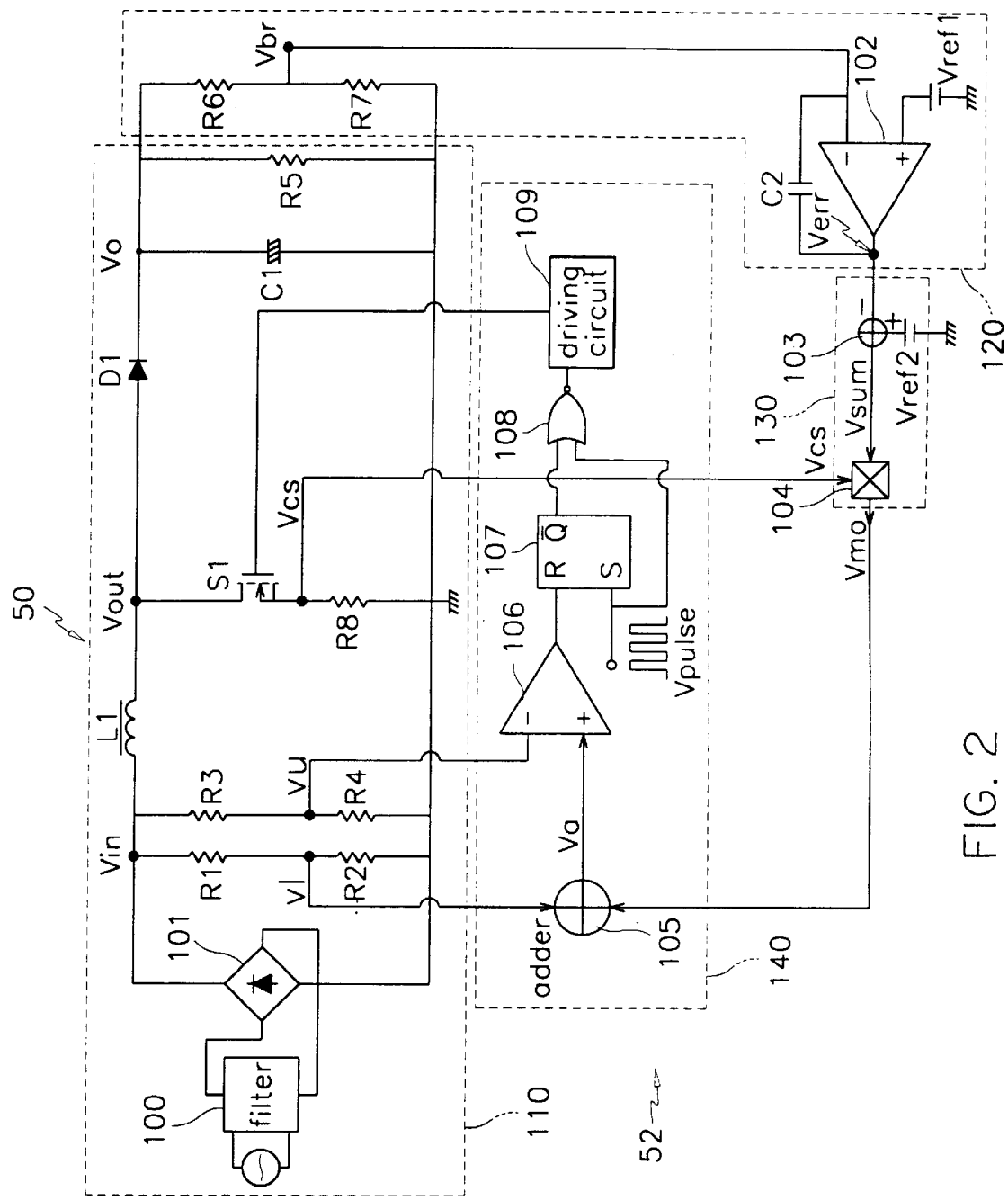
FIG. 2 is an exemplary schematic block diagram of a boost regulator having a power factor compensation controller according to an embodiment of the invention.

FIG. 2 is an exemplary schematic block diagram of a boost mode SPS 50 having a power factor compensation controller 52 according to an embodiment of the invention. The boost mode SPS 50 includes a boost convertor 110, an error amplification unit 120, a multiplication unit 130, and a switching driver 140, all connected as shown.

The boost convertor 110 includes a filter 100, a bridge rectifier 101, divider resistors R1–R4, load resistor R5, current sense resistor R8, a boost inductor L1, a switch S1, a rectifier diode D1, and a filter capacitor C1. The bridge rectifier 101 rectifies alternating current input power and provides a rectified input voltage Vin to the resistors R1 and R3 and to one end of the boost inductor L1. The divider resistors R1 and R2 provide a lower reference voltage Vl to the power factor compensation controller 52 and the divider resistors R3 and R4 provide an upper reference voltage Vu to the power factor compensation controller 52. As described in greater detail below, the power factor compensation controller 52 uses the upper and lower reference voltages Vu and Vl to control the switch S1 so that a peak current flowing through the switch S1 and the inductor L1 is proportional to (and substantially in-phase with) the input voltage Vin, thereby controlling the power factor of the boost mode SPS 50 to be substantially near one.

The error amplification unit 120 includes divider resistors R6 and R7, an error amplifier 102, a feedback capacitor C2, and a first reference voltage Vref1. The error amplification unit 120 monitors a divider voltage Vbr, which is a divided down portion of the output voltage Vo of the SPS 50, and compares the divider voltage Vbr to the first reference voltage Vref1 via the error amplifier 102. The error amplifier 102 generates an error voltage Verr, which is proportional to the load on the SPS 50, based on a difference between the divider voltage Vbr and the first reference voltage Vref1 and then couples the error voltage Verr to the multiplication unit 130.

The multiplication unit 130 includes a subtractor 103 and a multiplier 104. The subtractor 103 subtracts the error voltage Verr from a second reference voltage Vref2 and provides a subtractor output voltage Vsum to the multiplier 104. The second reference voltage Vref2 is set so that the subtractor output voltage Vsum is always positive. The multiplier 104 multiplies the subtractor output voltage Vsum by a current sense voltage Vcs, which is proportional to the current flowing through the current sense resistor R8 and the switch S1 of the boost convertor 110, to produce a multiplier output voltage Vmo. In this manner, the subtractor output voltage Vsum is used to scale the current sense voltage Vcs based on the load applied to the SPS 50.

The switching driver 140 includes an adder 105, a comparator 106, a set-reset flip-flop 107, a NOR gate 108, and a driving circuit 109, all connected as shown. The adder 105 adds the multiplier output voltage Vmo to the lower reference voltage Vl to generate an adder output voltage Va, which is applied to a non-inverting input of the comparator 106. The comparator 106 compares the adder output voltage Va to the upper reference voltage Vu, which is applied to an inverting input of the comparator 106. The output of the comparator 106 transitions to a logical high condition when the adder output voltage Va exceeds the upper reference voltage Vu. A fixed frequency clocking signal Vpulse is applied to a set input of the flip-flop 107 and an output of the comparator 106 is applied to a reset input of the flip-flop 107. The NOR gate 108 logically combines a $\overline{Q}$ output of the flip-flop 107 with the clocking signal Vpulse to produce a gating signal at the output of the NOR gate 108. The driving circuit 109 signal conditions the gating signal at the output of the NOR gate 108 to drive the gate or control terminal of the switch S1.

Figure 3:
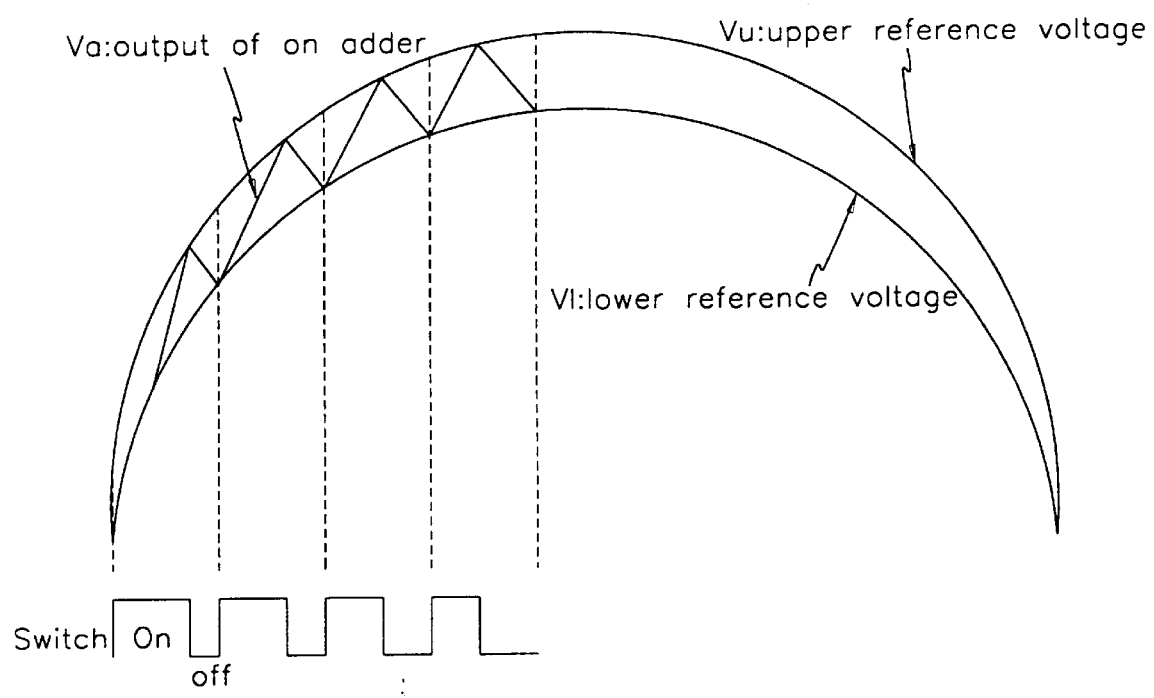
FIG. 3 graphically depicts one exemplary manner in which a switching signal may generated by the power factor compensation controller of FIG. 2.

FIG. 3 graphically depicts the manner in which a switching signal (i.e., the gating signal at the output of the NOR gate 108) is generated by the power factor compensation controller 52 of FIG. 2. The divider resistors R1–R4 are selected so that the upper reference voltage Vu represents a larger proportion of the input voltage Vin than the lower reference voltage Vl and, as shown in FIG. 3, the difference between the upper and lower reference voltages Vu and Vl is proportional to the instantaneous value of the input voltage Vin.

Initially, Vin is substantially near zero volts, the upper and lower reference voltages Vu and Vl are substantially near zero volts, the switch S1 is off, the current sense voltage Vcs is substantially near zero volts, the output of the multiplier 104 is substantially near zero volts, and the output of the comparator 107 is substantially near zero volts. When the input voltage Vin begins to increase, the upper and lower reference voltages Vu and Vl begin to increase at different rates as shown in FIG. 3 so that the difference between the upper and lower reference voltages Vu and Vl begins to increase. At the same time, the clocking signal Vpulse transitions to a logical high condition and sets the flip-flop 107 so that the $\overline{Q}$ output is in a logical low condition. When the clocking signal Vpulse transitions back to a logical low condition, the output of the NOR gate 108 transitions to a logical high condition, which causes the driving circuit 109 to turn on the switch S1.

With the power switch S1 on, the current flowing through the boost inductor L1, the switch S1, and the current sense resistor R8 begins to increase. As the current through the current sense resistor R8 increases, the current sense voltage Vcs increases, the voltage multiplier output voltage Vmo increases, and the adder output voltage Va increases. When the adder output voltage Va exceeds the upper reference voltage Vu, the output of the comparator 106 transitions to a logical high level, which resets the flip-flop 107 to cause the output of the NOR gate to transition to a logical low condition, thereby causing the driving circuit 109 to turn off the switch S1.

During normal operation, the above-described setting and resetting of the flip-flop 107 based on the fixed frequency clocking signal Vpulse and the comparison of the adder output voltage Va to the upper reference voltage Vu repeats for each cycle of the fixed frequency clocking signal Vpulse. Because the fixed frequency clocking signal Vpulse repeats at a frequency that is significantly greater than the frequency of the input voltage Vin, the switching controller 140 can control the envelope of the peak charging current, which flows through the switch S1 and the boost inductor L1, to be substantially in-phase with the input voltage Vin, thereby maintaining the power factor of the SPS 50 substantially close to one.

Figure 4:
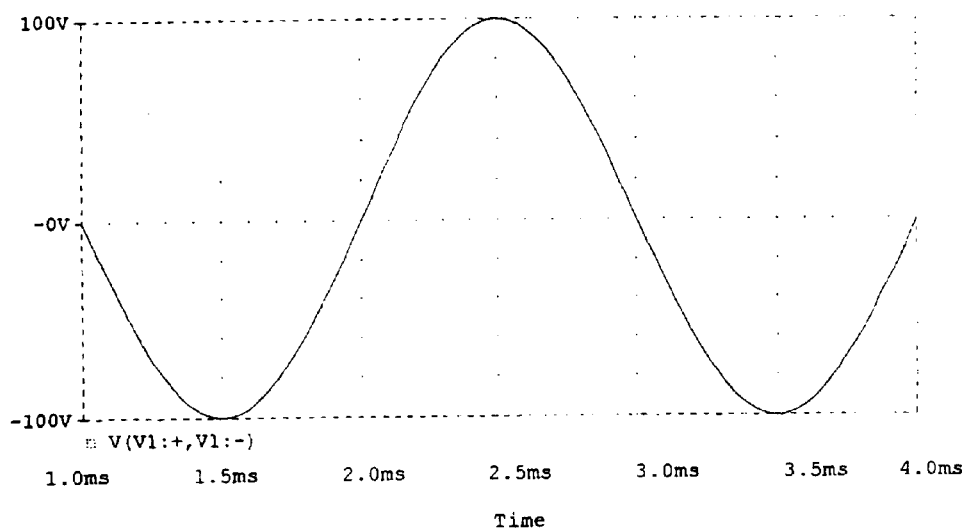
FIG. 4 graphically depicts a PSPICE simulation of an input voltage to the boost regulator of FIG. 2.
Figure 5:
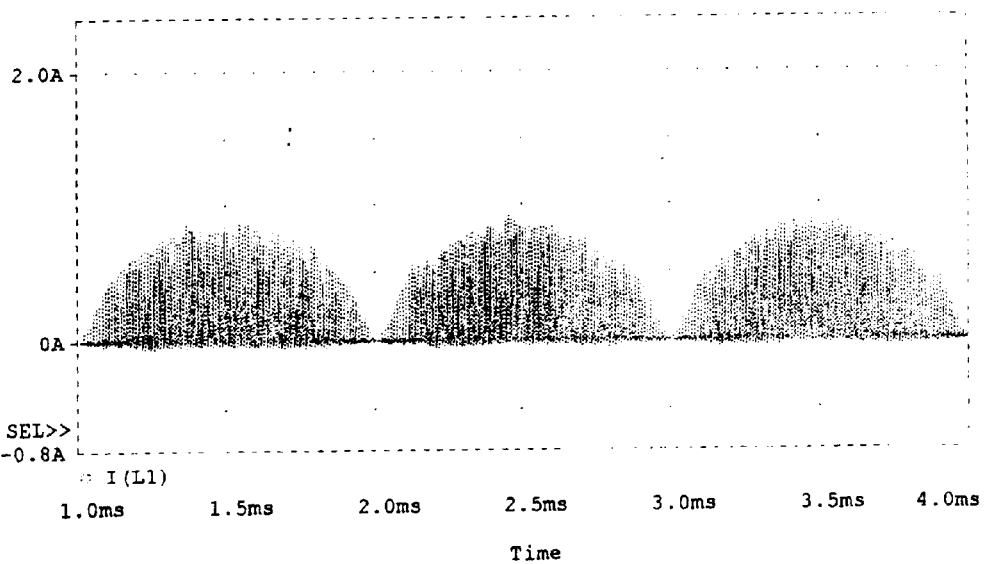
FIG. 5 graphically depicts a PSPICE simulation of a current flowing through the boost inductor used within the boost regulator of FIG. 2.
Figure 6:
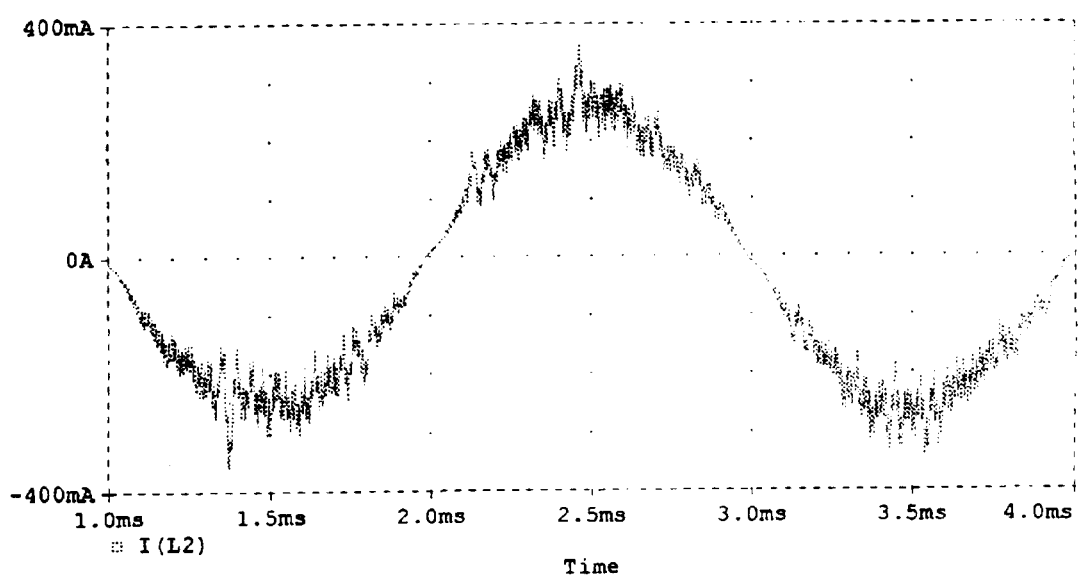
FIG. 6 graphically depicts a PSPICE simulation of an input current to the boost convertor of FIG. 2.

FIG. 4 graphically depicts a PSPICE simulation of an input voltage to the boost convertor 110 of FIG. 2, FIG. 5 graphically depicts a PSPICE simulation of a current flowing through the switch S1, and FIG. 6 graphically depicts a PSPICE simulation of an input current to the boost convertor 110 of FIG. 2. Those skilled in the art will recognize that the input voltage Vin and input current (FIG. 6) are substantially in-phase with one another because the phase compensation controller 52 controls the envelope of the peak charging current (See FIG. 5) flowing through the boost inductor L1 to be substantially in-phase with the rectified input voltage Vin.

The control of the peak current flowing through the boost inductor L1 and the switch S1 can be represented mathematically as described below. The point at which the comparator 106 transitions to a logical high level to reset the flip-flop 107 determines the peak charging current. Because the switching point of the comparator 106 occurs where the adder output voltage Va equals the upper reference voltage Vu, the switching point can be described in terms of the error voltage Verr, the current sense voltage Vcs, and the lower reference voltage Vl as shown in Equations 1 and 2 below.

$$Va = Verr * Vcs + Vl \quad \text{Equation 1}$$

$$Vu = Verr * Vcs + Vl \quad \text{Equation 2}$$

The upper and lower reference voltages Vu and Vl can be described in terms of an input voltage VIN as shown in Equations 3 and 4 below.

$$Vl = \frac{VIN}{A} * \sin \omega t \quad \text{Equation 3}$$

$$Vu = \frac{VIN}{B} * \sin \omega t \quad \text{Equation 4}$$

The current sense voltage Vcs can be represented as shown in Equation 5 below.

$$Vcs = i_L(t) * R8 \quad \text{Equation 5}$$

Substituting Equations 3 through 5 into Equation 2 and solving for $i_L(t)$ yields Equation 6 below.

$$i_L(t) = \frac{\frac{VIN}{B} - \frac{VIN}{A}}{Verr * R8} * \sin \omega t \quad \text{Equation 6}$$

As can be seen from Equation 6 above, the peak current $i_L(t)$ flowing through the boost inductor L1 is proportional (and is substantially in-phase with) the input voltage VIN to the SPS 50. Optimally, the multiplier 104 provides a gain $K_m$ as defined by Equation 7 below.

$$K_m = \frac{Vu - Vl}{Verr * Vcs} \quad \text{Equation 7}$$

A range of changes and modifications can be made to the preferred embodiment described above. The foregoing detailed description should be regarded as illustrative rather than limiting and the following claims, including all equivalents, are intended to define the scope of the invention.

What is claimed is:

1. A power factor compensation controller for use in a switching power supply having a switch, an inductor, and upper and lower reference signals that are proportional to an input voltage to the switching power supply, the power factor compensation controller comprising:

a multiplier that multiplies an error signal and a signal representative of a current in the switch to produce a multiplier output signal;

an adder that adds the multiplier output signal to the lower reference signal to produce an adder output signal;

a comparator that compares the adder output signal to the upper reference signal to produce a comparator output signal;

a flip-flop that receives the comparator output signal and a clocking signal; and a logic gate that receives an output of the flip-flop and the clocking signal to produce a gating signal for controlling the conduction of the switch so that an envelope of peak currents in the switch is substantially in-phase with the input voltage.

2. The power factor compensation controller of claim 1, wherein the flip-flop is a set-reset flip-flop.

3. The power factor compensation controller of claim 1, wherein the upper and lower reference signals are voltage signals.

4. The power factor compensation controller of claim 3, further comprising a plurality of divider resistors that divide the input voltage to the switching power supply to produce the upper and lower reference voltages.

5. The power factor compensation controller of claim 1, wherein the clocking signal is a substantially fixed frequency signal having a frequency greater than a frequency of the input voltage.

6. The power factor compensation controller of claim 1, wherein the signal representative of a current in the switch and the multiplier output signal are voltage signals.

7. The power factor compensation controller of claim 1, further comprising an error amplification unit that compares an output of the switching power supply to a first reference voltage to produce the error output voltage.

8. The power factor compensation controller of claim 7, wherein the error amplification unit includes an error amplifier that amplifies a difference between the output of the switching power supply and the first reference voltage.

9. The power factor compensation controller of claim 7, further comprising a subtractor and a second reference voltage, wherein the subtractor subtracts the error output voltage from the second reference voltage to produce the error signal.

10. The power factor compensation controller of claim 1, wherein the logic gate is a NOR gate.

11. A power factor compensation controller for use in a switching power supply having a switch, an inductor, and upper and lower reference signals that are proportional to an input voltage to the switching power supply, the power factor compensation controller comprising:

an error amplification unit that monitors an output of the switching power supply to produce an error signal;

a multiplication unit that multiplies the error signal and a signal representative of a current in the switch to produce a multiplier output signal;

a switching driver that receives the multiplier output signal and the upper and lower reference signals and produces a fixed frequency gating signal for controlling the conduction of the switch so that an envelope of peak currents in the switch is substantially in-phase with the input voltage.

12. The power factor compensation controller of claim 11, wherein the switching driver comprises:
   an adder that adds the multiplier output signal and the lower reference signal to produce an adder output signal;
   a comparator that compares the adder output signal to the upper reference voltage to produce a comparator output signal; and
   a flip-flop that receives the comparator output signal and a clocking signal.

13. The power factor compensation controller of claim 11, wherein the error amplification unit comprises:
   a resistive divider coupled to the output of the switching power supply;
   an error amplifier coupled to the resistive divider; and
   a reference voltage coupled to the error amplifier.

14. The power factor compensation controller of claim 11, wherein the multiplication unit comprises:
   a subtractor;
   a reference signal coupled to the subtractor; and
   a multiplier coupled to the subtractor that produces the multiplier output signal based on an output of the subtractor and the signal representative of a current flowing through the switch.

15. The power factor compensation controller of claim 11, wherein the upper and lower reference signals are voltage signals.

16. The power factor compensation controller of claim 15, further comprising a plurality of divider resistors that divide the input voltage to the switching power supply to produce the upper and lower reference voltages.

* * * * *